United States Patent
Mongeon

(10) Patent No.: US 7,495,799 B2
(45) Date of Patent: Feb. 24, 2009

(54) MAXIMUM GAMUT STRATEGY FOR THE PRINTING SYSTEMS

(75) Inventor: Michael C. Mongeon, Walworth, NY (US)

(73) Assignee: Xerox Corporation, Norwalk, CT (US)

( * ) Notice: Subject to any disclaimer, the term of this patent is extended or adjusted under 35 U.S.C. 154(b) by 637 days.

(21) Appl. No.: 11/234,553

(22) Filed: Sep. 23, 2005

(65) Prior Publication Data

US 2007/0070455 A1    Mar. 29, 2007

(51) Int. Cl.
*H04N 1/60* (2006.01)
*G03F 3/08* (2006.01)
*G03G 15/00* (2006.01)

(52) U.S. Cl. .......................... 358/1.9; 358/520; 399/45

(58) Field of Classification Search .................. 358/1.9, 358/2.1, 520; 399/45
See application file for complete search history.

(56) References Cited

U.S. PATENT DOCUMENTS

| | | | |
|---|---|---|---|
| 4,579,446 A | 4/1986 | Fujino et al. |
| 4,587,532 A | 5/1986 | Asano |
| 4,836,119 A | 6/1989 | Siraco et al. |
| 5,004,222 A | 4/1991 | Dobashi |
| 5,080,340 A | 1/1992 | Hacknauer et al. |
| 5,095,342 A | 3/1992 | Farrell et al. |
| 5,159,395 A | 10/1992 | Farrell et al. |
| 5,208,640 A | 5/1993 | Horie et al. |
| 5,272,511 A | 12/1993 | Conrad et al. |
| 5,326,093 A | 7/1994 | Sollitt |
| 5,435,544 A | 7/1995 | Mandel |
| 5,473,419 A | 12/1995 | Russel et al. |
| 5,489,969 A | 2/1996 | Soler et al. |
| 5,504,568 A | 4/1996 | Saraswat et al. |
| 5,525,031 A | 6/1996 | Fox |
| 5,557,367 A | 9/1996 | Yang et al. |
| 5,568,246 A | 10/1996 | Keller et al. |
| 5,570,172 A | 10/1996 | Acquaviva |
| 5,596,416 A | 1/1997 | Barry et al. |
| 5,596,428 A | 1/1997 | Tytgat |
| 5,629,762 A | 5/1997 | Mahoney et al. |
| 5,710,968 A | 1/1998 | Clark et al. |
| 5,778,377 A | 7/1998 | Marlin et al. |
| 5,884,118 A * | 3/1999 | Mestha et al. ................. 399/15 |
| 5,884,910 A | 3/1999 | Mandel |
| 5,995,721 A | 11/1999 | Rourke et al. |

(Continued)

OTHER PUBLICATIONS

Morgan, P.F., "Integration of Black Only and Color Printers", Xerox Disclosure Journal, vol. 16, No. 6, Nov./Dec. 1991, pp. 381-383.

(Continued)

*Primary Examiner*—Twyler L. Haskins
*Assistant Examiner*—Barbara D Reinier
(74) *Attorney, Agent, or Firm*—Fay Sharpe LLP

(57) ABSTRACT

Samples are printed on print media with at least first and second marking engines. A first lightness value of a solid area of a first sample printed with the first marking engine and a second lightness value of a solid area of a second sample printed with the second marking engine are determined. The first and second solid area lightness values are compared to one another. Based on the comparison, a lighter marking engine and a darker marking engine are identified. Tone reproduction curve of the lighter marking engine is adjusted to substantially match tone reproduction curve of the darker marking engine.

16 Claims, 4 Drawing Sheets

U.S. PATENT DOCUMENTS

| | | | |
|---|---|---|---|
| 6,059,284 | A | 5/2000 | Wolf et al. |
| 6,125,248 | A | 9/2000 | Moser |
| 6,128,022 | A | 10/2000 | Dillinger |
| 6,241,242 | B1 | 6/2001 | Munro |
| 6,297,886 | B1 | 10/2001 | Cornell |
| 6,341,773 | B1 | 1/2002 | Aprato et al. |
| 6,384,918 | B1 | 5/2002 | Hubble, III et al. |
| 6,450,711 | B1 | 9/2002 | Conrow |
| 6,476,376 | B1 | 11/2002 | Biegelsen et al. |
| 6,476,923 | B1 | 11/2002 | Cornell |
| 6,493,098 | B1 | 12/2002 | Cornell |
| 6,537,910 | B1 | 3/2003 | Burke et al. |
| 6,550,762 | B2 | 4/2003 | Stoll |
| 6,554,276 | B2 | 4/2003 | Jackson et al. |
| 6,577,925 | B1 | 6/2003 | Fromherz |
| 6,607,320 | B2 | 8/2003 | Bobrow et al. |
| 6,608,988 | B2 | 8/2003 | Conrow |
| 6,612,566 | B2 | 9/2003 | Stoll |
| 6,612,571 | B2 | 9/2003 | Rider |
| 6,621,576 | B2 | 9/2003 | Tandon et al. |
| 6,633,382 | B2 | 10/2003 | Hubble, III et al. |
| 6,639,669 | B2 | 10/2003 | Hubble, III et al. |
| 6,819,906 | B1 | 11/2004 | Herrmann et al. |
| 6,925,283 | B1 | 8/2005 | Mandel et al. |
| 2002/0078012 | A1 | 6/2002 | Ryan et al. |
| 2002/0103559 | A1 | 8/2002 | Gartstein |
| 2003/0077095 | A1 | 4/2003 | Conrow |
| 2003/0164960 | A1* | 9/2003 | Housel ............... 358/1.9 |
| 2004/0010756 | A1* | 1/2004 | Hobbs ............... 715/526 |
| 2004/0085561 | A1 | 5/2004 | Fromherz |
| 2004/0085562 | A1 | 5/2004 | Fromherz |
| 2004/0088207 | A1 | 5/2004 | Fromherz |
| 2004/0150156 | A1 | 8/2004 | Fromherz et al. |
| 2004/0150158 | A1 | 8/2004 | Biegelsen et al. |
| 2004/0153983 | A1 | 8/2004 | McMillan |
| 2004/0216002 | A1 | 10/2004 | Fromherz et al. |
| 2004/0225391 | A1 | 11/2004 | Fromherz et al. |
| 2004/0225394 | A1 | 11/2004 | Fromherz et al. |
| 2004/0247365 | A1 | 12/2004 | Lofthus et al. |

OTHER PUBLICATIONS

Desmond Fretz, "Cluster Printing Solution Announced", Today at Xerox (TAX), No. 1129, Aug. 3, 2001.
U.S. Appl. No. 10/761,522, filed Jan. 21, 2004, Mandel et al.
U.S. Appl. No. 10/785,211, filed Feb. 24, 2004, Lofthus et al.
U.S. Appl. No. 10/881,619, filed Jun. 30, 2004, Bobrow.
U.S. Appl. No. 10/917,676, filed Aug. 13, 2004, Lofthus et al.
U.S. Appl. No. 10/917,768, filed Aug. 13, 2004, Lofthus et al.
U.S. Appl. No. 10/924,106, filed Aug. 23, 2004, Lofthus et al.
U.S. Appl. No. 10/924,113, filed Aug. 23, 2004, deJong et al.
U.S. Appl. No. 10/924,458, filed Aug. 23, 2004, Lofthus et al.
U.S. Appl. No. 10/924,459, filed Aug. 23, 2004, Mandel et al.
U.S. Appl. No. 10/933,556, filed Sep. 3, 2004, Spencer et al.
U.S. Appl. No. 10/953,953, filed Sep. 29, 2004, Radulski et al.
U.S. Appl. No. 10/999,326, filed Nov. 30, 2004, Grace et al.
U.S. Appl. No. 10/999,450, filed Nov. 30, 2004, Lofthus et al.
U.S. Appl. No. 11/000,158, filed Nov. 30, 2004, Roof.
U.S. Appl. No. 11/000,168, filed Nov. 30, 2004, Biegelsen et al.
U.S. Appl. No. 11/000,258, filed Nov. 30, 2004, Roof.
U.S. Appl. No. 11/001,890, filed Dec. 2, 2004, Lofthus et al.
U.S. Appl. No. 11/051,817, filed Feb. 4, 2005, Moore et al.
U.S. Appl. No. 11/070,681, filed Mar. 2, 2005, Viturro et al.
U.S. Appl. No. 11/081,473, filed Mar. 16, 2005, Moore.
U.S. Appl. No. 11/069,050, filed Feb. 28, 2005, Lofthus et al.
U.S. Appl. No. 11/089,854, filed Mar. 25, 2005, Clark et al.
U.S. Appl. No. 11/090,498, filed Mar. 25, 2005, Clark.
U.S. Appl. No. 11/090,502, filed Mar. 25, 2005, Mongeon.
U.S. Appl. No. 11/095,378, filed Mar. 31, 2005, Moore et al.
U.S. Appl. No. 11/094,998, filed Mar. 31, 2005, Moore et al.
U.S. Appl. No. 11/094,864, filed Mar. 31, 2005, de Jong et al.
U.S. Appl. No. 11/095,872, filed Mar. 31, 2005, Julien et al.
U.S. Appl. No. 11/102,355, filed Apr. 8, 2005, Fromherz et al.
U.S. Appl. No. 11/084,280, filed Mar. 18, 2005, Mizes.
U.S. Appl. No. 11/109,566, filed Apr. 19, 2005, Mandel et al.
U.S. Appl. No. 11/109,558, filed Apr. 19, 2005, Furst et al.
U.S. Appl. No. 11/109,996, filed Apr. 20, 2005, Mongeon et al.
U.S. Appl. No. 11/093,229, filed Mar. 29, 2005, Julien.
U.S. Appl. No. 11/102,899, filed Apr. 8, 2005, Crawford et al.
U.S. Appl. No. 11/102,910, filed Apr. 8, 2005, Crawford et al.
U.S. Appl. No. 11/115,766, filed Apr. 27, 205, Grace.
U.S. Appl. No. 11/102,332, filed Apr. 8, 2005, Hindi et al.
U.S. Appl. No. 11/136,959, filed May 25, 2005, German et al.
U.S. Appl. No. 11/136,821, filed May 25, 2005, Robinson.
U.S. Appl. No. 11/122,420, filed May 5, 2005, Richards.
U.S. Appl. No. 11/137,634, filed May 25, 2005, Lofthus et al.
U.S. Appl. No. 11/137,251, filed May 25, 2005, Lofthus et al.
U.S. Appl. No. 11/137,273, filed May 25, 2005, Anderson et al.
U.S. Appl. No. 11/152,275, filed Jun. 14, 2005, Roof et al.
U.S. Appl. No. 11/156,778, filed Jun. 20, 2005, Swift.
U.S. Appl. No. 11/157,598, filed Jun. 21, 2005, Frankel.
U.S. Appl. No. 11/143,818, filed Jun. 2, 2005, Dalal et al.
U.S. Appl. No. 11/146,665, filed Jun. 7, 2005, Mongeon.
U.S. Appl. No. 11/166,299, filed Jun. 24, 2005, Moore.
U.S. Appl. No. 11/166,460, filed Jun. 24, 2005, Roof et al.
U.S. Appl. No. 11/165,581, filed Jun. 24, 2005, Lang et al.
U.S. Appl. No. 11/166,763, filed Jun. 24, 2005, Thayer.
U.S. Appl. No. 11/166,961, filed Jun. 24, 2005, Moore.
U.S. Appl. No. 11/170,873, filed Jun. 30, 2005, Klassen.
U.S. Appl. No. 11/170,975, filed Jun. 30, 2005, Klassen.
U.S. Appl. No. 11/168,152, filed Jun. 28, 2005, German et al.
U.S. Appl. No. 11/170,845, filed Jun. 30, 2005, Sampath et al.
U.S. Appl. No. 11/189,371, filed Jul. 26, 2005, Moore et al.

* cited by examiner

MAXIMUM GAMUT STRATEGY FOR THE PRINTING SYSTEMS

BACKGROUND

The present exemplary embodiment relates to printing systems. It finds particular application in conjunction with adjusting image quality in print or marking systems with multiple marking engines. However, it is to be appreciated that the present exemplary embodiment is also amenable to other like applications.

Document processing systems that include a plurality of marking engines provide increased production speed. In such systems, quality of printing from one engine to another is of great concern. Subtle changes that may be unnoticed in the output of a single marking engine can be highlighted in the output of a multi-engine marking system. For example, the facing pages of an opened booklet rendered or printed by a multi-engine printing system can be printed by different engines. For instance, the left-hand page in an open booklet may be printed by a first print engine while the right-hand page is printed by a second print engine. The first print engine may be printing images in a manner slightly darker than the ideal and well within a single engine tolerance; while the second print engine may be printing images in a manner slightly lighter than the ideal and also within the single engine tolerance. While an observer might not ever notice the subtle variations when reviewing the output of either engine alone, when the combined output is compiled and displayed adjacently, the variation in intensity from one marking engine to another may become noticeable and be perceived as an issue of quality by a user.

More problems arise in the multi-engine systems which include a mix of color and monochrome marking engines. The image quality in the product produced by monochrome and color printers may differ due to several factors. For example, the color printers are typically darker, produce more gloss, and characterized by higher halftone frequency. One approach to improve image consistency between color and monochrome engines is to reduce the gamut of the color marking engine to match closely the gamut of the monochrome marking engine. However, in such approach, the color intensity of the color printer is also reduced.

There is a need for methods and apparatuses that overcome the aforementioned problems and others.

CROSS REFERENCE TO RELATED APPLICATIONS

The following applications, the disclosures of each being totally incorporated herein by reference are mentioned:

U.S. application Ser. No. 10/761,522, filed Jan. 21, 2004, entitled "HIGH RATE PRINT MERGING AND FINISHING SYSTEM FOR PARALLEL PRINTING," by Barry P. Mandel, et al.;

U.S. application Ser. No. 10/917,676, filed Aug. 13, 2004, entitled "MULTIPLE OBJECT SOURCES CONTROLLED AND/OR SELECTED BASED ON A COMMON SENSOR," by Robert M. Lofthus, et al.;

U.S. application Ser. No. 10/999,326, filed Nov. 30, 2004, entitled "SEMI-AUTOMATIC IMAGE QUALITY ADJUSTMENT FOR MULTIPLE MARKING ENGINE SYSTEMS," by Robert E. Grace, et al.;

U.S. application Ser. No. 11/070,681, filed Mar. 2, 2005, entitled "GRAY BALANCE FOR A PRINTING SYSTEM OF MULTIPLE MARKING ENGINES," by R. Enrique Viturro, et al.;

U.S. application Ser. No. 11/081,473, filed Mar. 16, 2005, entitled "PRINTING SYSTEM," by Steven R. Moore;

U.S. application Ser. No. 11/084,280, filed Mar. 18, 2005, entitled "SYSTEMS AND METHODS FOR MEASURING UNIFORMITY IN IMAGES," by Howard Mizes;

U.S. application Ser. No. 11/090,502, filed Mar. 25, 2005, entitled IMAGE QUALITY CONTROL METHOD AND APPARATUS FOR MULTIPLE MARKING ENGINE SYSTEMS," by Michael C. Mongeon;

U.S. application Ser. No. 11/095,378, filed Mar. 31, 2005, entitled "IMAGE ON PAPER REGISTRATION ALIGNMENT," by Steven R. Moore, et al.;

U.S. application Ser. No. 11/109,558, filed Apr. 19, 2005, entitled "SYSTEMS AND METHODS FOR REDUCING IMAGE REGISTRATION ERRORS," by Michael R. Furst et al.;

U.S. application Ser. No. 11/109,996, filed Apr. 20, 2005, entitled "PRINTING SYSTEMS," by Michael C. Mongeon et al.;

U.S. application Ser. No. 11/115,766, Filed Apr. 27, 2005, entitled "IMAGE QUALITY ADJUSTMENT METHOD AND SYSTEM," by Robert E. Grace;

U.S. application Ser. No. 11/146,665, filed Jun. 7, 2005, entitled "LOW COST ADJUSTMENT METHOD FOR PRINTING SYSTEMS," by Michael C. Mongeon;

U.S. application Ser. No. 11/170,975, filed Jun. 30, 2005, entitled "METHOD AND SYSTEM FOR PROCESSING SCANNED PATCHES FOR USE IN IMAGING DEVICE CALIBRATION," by R. Victor Klassen; and U.S. application Ser. No. 11/170,873, filed Jun. 30, 2005, entitled "COLOR CHARACTERIZATION OR CALIBRATION TARGETS WITH NOISE-DEPENDENT PATCH SIZE OR NUMBER," by R. Victor Klassen.

REFERENCES

U.S. Pat. No. 6,128,022, which issued Oct. 3, 2000 to Dillinger, entitled "Coordinating color produced by two devices—using a hue-controlled machine color space, or surface scaling," discusses device-space color specifications for two color-presentation devices are interrelated through the intermediary of at least one perceptual color space. This mapping through perceptual space can be used to produce the effect of matching the two device gamuts to each other, so that the full gamuts of both are in effect merged.

U.S. Pat. No. 5,596,428, which issued Jan. 21, 1997 to Tytgat, entitled "Color matching by systems calibration, linear and non-linear gamut mapping," discusses a color matching method is described for matching the appearance of an image on a second color imaging system to an image on a first color imaging system.

However, the aforementioned Patents are not concerned with methods and systems for improving or achieving image consistency between or among a plurality of marking engines which include monochrome and color marking engines.

BRIEF DESCRIPTION

According to one aspect, a method is disclosed. Samples are printed on print media with at least first and second marking engines. A first lightness value of a solid area of a first sample printed with the first marking engine is determined. A second lightness value of a solid area of a second sample printed with the second marking engines is determined. The first and second solid area lightness values are compared to one another. Based on the comparison, a lighter marking engine and a darker marking engine are identified. Tone reproduction curve of the lighter marking engine is adjusted to substantially match tone reproduction curve of the darker marking engine.

According to another aspect, a document processing system is disclosed. Two or more marking engines print samples, each sample including at least a solid area. A sensor measures light reflected from each printed sample. An analyzer analyzes light measurements associated with the samples printed with the engines, determines a lightness value of each solid area of each printed sample, and compares the solid area lightness values to one another to identify lighter and darker marking engines. An actuator adjuster adjusts tone reproduction curve of the lighter marking engine to substantially match tone reproduction curve of the darker marking engine.

According to another aspect, a method is disclosed. Samples are printed on print media with at least monochrome and color marking engines. A first lightness value of a solid area of a first sample printed with the monochrome marking engine is determined. A second lightness value of a solid area of a second sample printed with the color marking engine is determined. Tone reproduction curve of the monochrome marking engine is adjusted to substantially match tone reproduction curve of the color marking engine.

DETAILED DESCRIPTION

Figure 1:
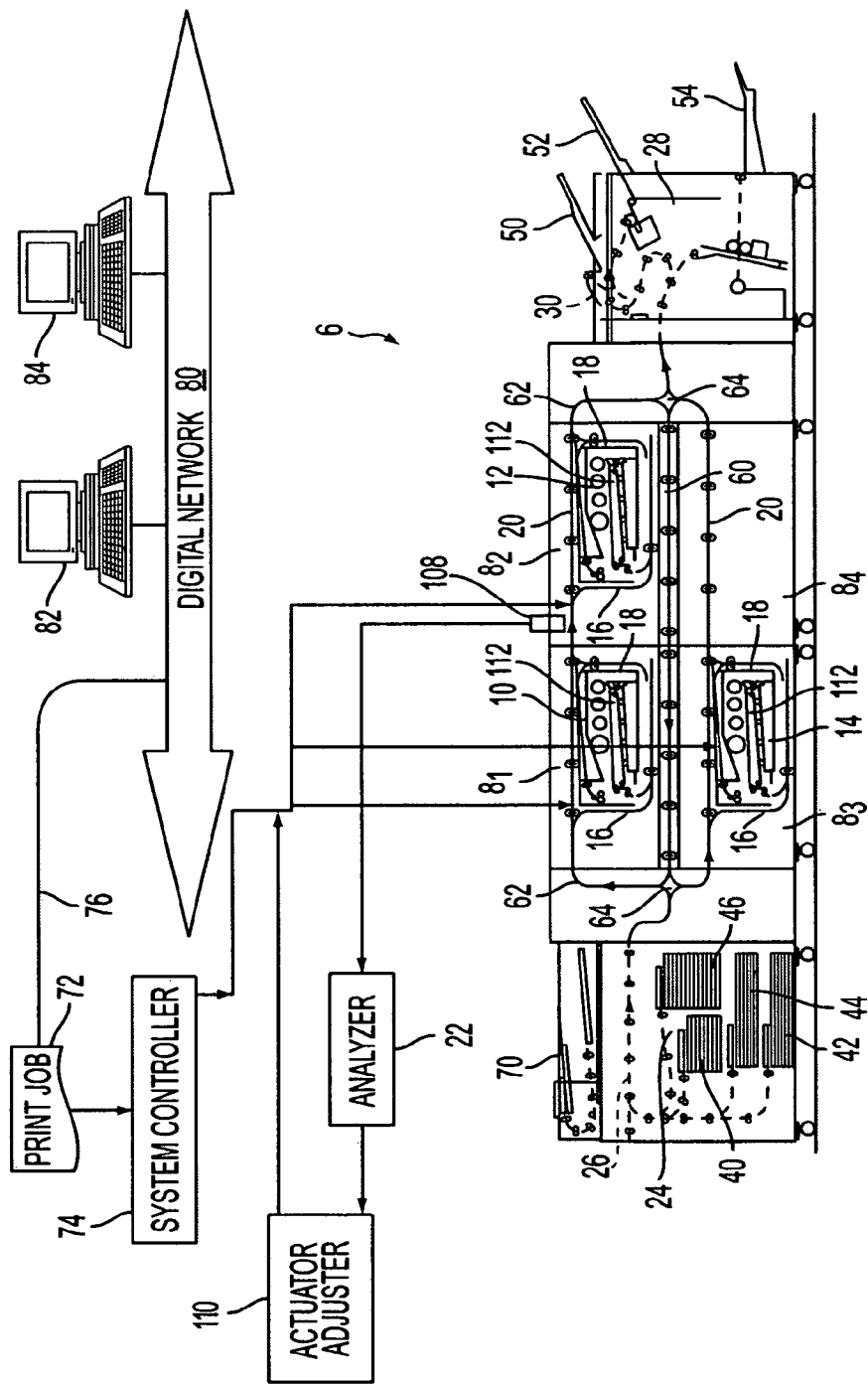
FIG. 1 is a view of a document processing system including a plurality of print engines.

With reference to FIG. 1, an example printing or document processing system 6 includes first, second, . . . , nth marking engine processing units $8_1, 8_2, 8_3, \ldots, 8_n$ each including an associated first, second, . . . , nth marking engines or devices 10, 12, 14 and associated entry and exit inverter/bypasses 16, 18. In some embodiments, marking engines are removable. For example, in FIG. 1, an integrated marking engine and entry and exit inverter/bypasses of the processing unit $8_4$ are shown as removed, leaving only a forward or upper paper path 20. In this manner, for example, the functional marking engine portion can be removed for repair, or can be replaced to effectuate an upgrade or modification of the printing system 6. While three marking engines 10, 12, 14 are illustrated (with the fourth marking engine being removed), the number of marking engines can be one, two, three, four, five, or more. Providing at least two marking engines typically provides enhanced features and capabilities for the printing system 6 since marking tasks can be distributed amongst the at least two marking engines. Some or all of the marking engines 10, 12, 14 may be identical to provide redundancy or improved productivity through parallel printing. Alternatively or additionally, some or all of the marking engines 10, 12, 14 may be different to provide different capabilities. For example, the marking engines 12,14 may be color marking engines, while the marking engine 10 may be a black (K) marking engine. As discussed in detail below, an analyzer 22 matches tone reproduction curves between the marking engines to avoid noticeable lightness differences within a print job while maintaining the gamut of the color engines.

The illustrated marking engines 10, 12, 14 employ xerographic printing technology, in which an electrostatic image is formed and coated with a toner material, and then transferred and fused to paper or another print medium by application of heat and pressure. However, marking engines employing other printing technologies can be provided, such as marking engines employing ink jet transfer, thermal impact printing, or so forth. The processing units of the printing system 6 can also be other than marking engines; such as, for example, a print media feeding source or feeder 24 which includes associated print media conveying components 26. The media feeding source 24 supplies paper or other print media for printing. Another example of the processing unit is a finisher 28 which includes associated print media conveying components 30. The finisher 28 provides finishing capabilities such as collation, stapling, folding, stacking, hole-punching, binding, postage stamping, or so forth.

The print media feeding source 24 includes print media sources or input trays 40, 42, 44, 46 connected with the print media conveying components 26 to provide selected types of print media. While four print media sources are illustrated, the number of print media sources can be one, two, three, four, five, or more. Moreover, while the illustrated print media sources 40, 42, 44,46 are embodied as components of the dedicated print media feeding source 24, in other embodiments one or more of the marking engine processing units may include its own dedicated print media source instead of or in addition to those of the print media feeding source 24. Each of the print media sources 40, 42, 44, 46 can store sheets of the same type of print media, or can store different types of print media. For example, the print media sources 42, 44 may store the same type of large-size paper sheets, print media source 40 may store company letterhead paper, and the print media source 46 may store letter-size paper. The print media can be substantially any type of media upon which one or more of the marking engines 10, 12,14 can print, such as high quality bond paper, lower quality "copy" paper, overhead transparency sheets, high gloss paper, and so forth.

Since multiple jobs arrive at the finisher 28 during a common time interval, the finisher 28 includes two or more print media finishing destinations or stackers 50, 52, 54 for collecting sequential pages of each print job that is being contemporaneously printed by the printing system 6. Generally, the number of the print jobs that the printing system 6 can contemporaneously process is limited to the number of available stackers. While three finishing destinations are illustrated, the printing system 6 may include two, three, four, or more print media finishing destinations. The finisher 28 deposits each sheet after processing in one of the print media finishing destinations 50, 52, 54, which may be trays, pans, stackers and so forth. While only one finishing processing unit is illustrated, it is contemplated that two, three, four or more finishing processing units can be employed in the printing system 6.

Bypass routes in each marking engine processing unit provide a means by which the sheets can pass through the corresponding marking engine processing unit without interacting with the marking engine. Branch paths are also provided to take the sheet into the associated marking engine and to deliver the sheet back to the upper or forward paper path 20 of the associated marking engine processing unit.

The printing system 6 executes print jobs. Print job execution involves printing selected text, line graphics, images, machine ink character recognition (MICR) notation, or so forth on front, back, or front and back sides or pages of one or more sheets of paper or other print media. In general, some sheets may be left completely blank. In general, some sheets may have mixed color and black-and-white printing. Execution of the print job may also involve collating the sheets in a certain order. Still further, the print job may include folding, stapling, punching holes into, or otherwise physically manipulating or binding the sheets.

Print jobs can be supplied to the printing system 6 in various ways. A built-in optical scanner 70 can be used to scan a document such as book pages, a stack of printed pages, or so forth, to create a digital image of the scanned document that is reproduced by printing operations performed by the printing system 6. Alternatively, one or more print jobs 72 can be electronically delivered to a system controller 74 of the printing system 6 via a wired connection 76 from a digital network 80 that interconnects example computers 82, 84 or other digital devices. For example, a network user operating word processing software running on the computer 84 may select to print the word processing document on the printing system 6, thus generating the print job 72, or an external scanner (not shown) connected to the network 80 may provide the print job in electronic form. While a wired network connection 76 is illustrated, a wireless network connection or other wireless communication pathway may be used instead or additionally to connect the printing system 6 with the digital network 80. The digital network 80 can be a local area network such as a wired Ethernet, a wireless local area network (WLAN), the Internet, some combination thereof, or so forth. Moreover, it is contemplated to deliver print jobs to the printing system 6 in other ways, such as by using an optical disk reader (not illustrated) built into the printing system 6, or using a dedicated computer connected only to the printing system 6.

The printing system 6 is an illustrative example. In general, any number of print media sources, media handlers, marking engines, collators, finishers or other processing units can be connected together by a suitable print media conveyor configuration. While the printing system 6 illustrates a 2×2 configuration of four marking engines, buttressed by the print media feeding source on one end and by the finisher on the other end, other physical layouts can be used, such as an entirely horizontal arrangement, stacking of processing units three or more units high, or so forth. Moreover, while in the printing system 6 the processing units have removable functional portions, in some other embodiments some or all processing units may have non-removable functional portions. It is contemplated that even if the marking engine portion of the marking engine processing unit is non-removable, associated upper or forward paper paths 20 through each marking engine processing unit enables the marking engines to be taken "offline" for repair or modification while the remaining processing units of the printing system continue to function as usual.

In some embodiments, separate bypasses for intermediate components may be omitted. The "bypass path" of the conveyor in such configurations suitably passes through the functional portion of a processing unit, and optional bypassing of the processing unit is effectuated by conveying the sheet through the functional portion without performing any processing operations. Still further, in some embodiments the printing system may be a stand alone printer or a cluster of networked or otherwise logically interconnected printers, with each printer having its own associated print media source and finishing components including a plurality of final media destinations.

Although several media path elements are illustrated, other path elements are contemplated which might include, for example, inverters, reverters, interposers, and the like, as known in the art to direct the print media between the feeders, printing or marking engines and/or finishers.

The controller 74 controls the production of printed sheets, the transportation over the media path, and the collation and assembly as job output by the finisher.

Figure 2:
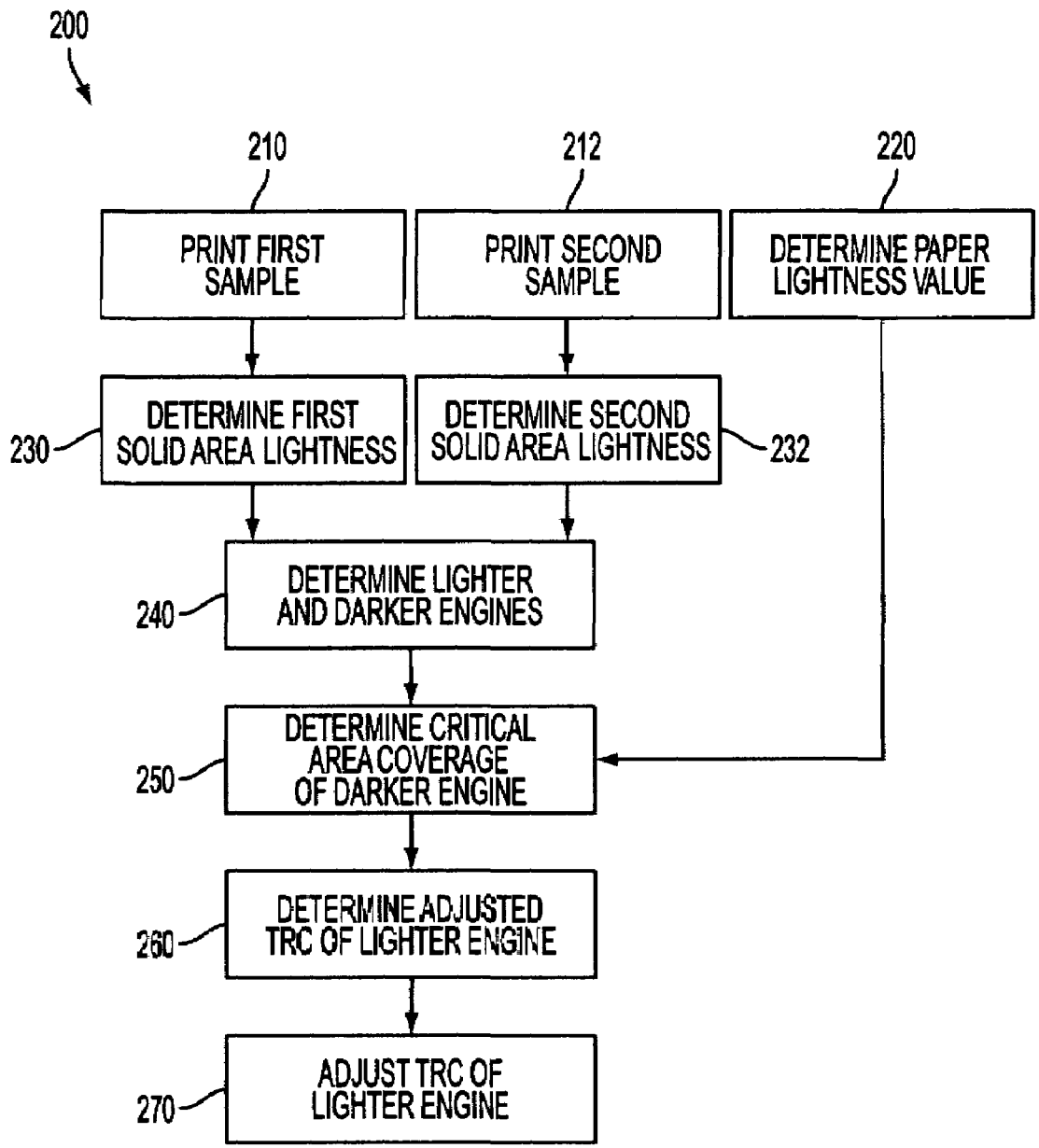
FIG. 2 is a flow chart outlining a method to control image consistency of the document processing system which includes multiple marking engines.

With continuing reference to FIG. 1 and further reference to FIG. 2, a method 200 controls image consistency in the document processing system 6 that includes the first and second marking engines 10, 12. Although illustrated with reference to only two marking engines with the first marking engine 10 being a monochrome marking engine (K), and the second marking engine 12 being a color marking engine, it is contemplated that the control method 200 is applicable to the printing systems which include more than two print engines which can be color, monochrome or a combination of color and monochrome. A first sample or image is printed 210 with the first marking engine 10 to generate a first rendered version of the first image, which is sensed by one or more sensors 108 which operate to generate a computer readable representation of the printed image which is analyzed by the analyzer 22. The sensors, for example, are disposed inside the corresponding marking device 10, 12, i.e., in situ. Sensing of the samples may be performed by optical sensors that can be either array-type optical sensors or point optical sensors. According to various alternative embodiments, one or more optical sensors 108 could be located outside the marking engine such as in the upper print path 20. A second sample or image is printed 212 with the second marking engine 12 to generate the second rendered version of the second image, which is sensed by the sensor 108 and analyzed by the analyzer 22. The analyzer 22 determines an amount by which one of the marking engines should be adjusted based on the analysis by an actuator adjuster 110 via one or more actuators 112. Such actuators are known in the art and are associated with various marking engines technology. As a result of the adjustment, the density of portions of the printjob printed with the first marking engine 10 substantially matches the density of portions of the print job printed with the second marking engine 12.

With continuing reference to FIGS. 1 and 2, analyzing the first and second images can include any analysis appropriate to measure image and the aspect or aspects of marking engine processes that are being studied, analyzed, adjusted or compensated for.

Lightness $L^*_{paper}$ of paper or print media is preferably a known value which can be determined in advance. Optionally, as the paper lightness $L^*_{paper}$ might change from one stack of print media to another, the lightness $L^*_{paper}$ of the print media is determined 220 by measuring the average gray level of the blank sheet. Such measurement, for example, can take place by internally scheduling to process a blank sheet periodically.

A first lightness or solid area density $L^*_{sad\_1}$ of the first marking engine 10 is determined 230 by measuring gray scale value of the solid area of the first sample produced by the first marking engine 10. A second lightness or solid area density $L^*_{sad\_2}$ of the second color marking engine 12 is determined 232 by measuring a lightness of a solid area of the second sample produced by the second marking engine 12.

A lightness $L^*_1$ of the first sample or the first marking engine is determined at various input area coverage AC according to equation:

$$L^*_1(AC) = L^*_{paper} + \frac{L^*_{sad\_1} - L_{paper}}{100} * AC, \text{ where}$$

$L^*_1(AC)$ is the lightness of the first marking engine;
$L^*_{paper}$ is the lightness of the print media, or $L^*(0)$;
AC is the area coverage; and
$L^*_{sad\_1}$ is the lightness of the solid area or the solid area density of the first marking engine, or $L^*(100)$.

A lightness $L^*_2$ of the second sample or the second marking engine is determined at various input area coverage AC according to equation:

$$L^*_2(AC) = L^*_{paper} + \frac{L^*_{sad\_2} - L_{paper}}{100} * AC, \text{ where}$$

$L^*_2(AC)$ is the lightness of the second engine;
$L^*_{paper}$ is the lightness of the print media or $L^*(0)$;
AC is the area coverage; and
$L^*_{sad\_2}$ is the lightness of the solid area or the solid area density of the second marking engine, or $L^*(100)$.

Engine with a higher density of the solid area is determined, e.g., it is determined 240 which engine is a lighter engine and which engine is a darker engine. More specifically, an engine to engine difference in lightness $\Delta L^*$ is determined according to equation:

$$\Delta L^*(AC) = L^*_1(AC) - L^*_2(AC),$$

or $$\Delta L^*(AC) = \frac{L^*_{sad\_1} - L^*_{sad\_2}}{100} * AC,$$

Figure 3:
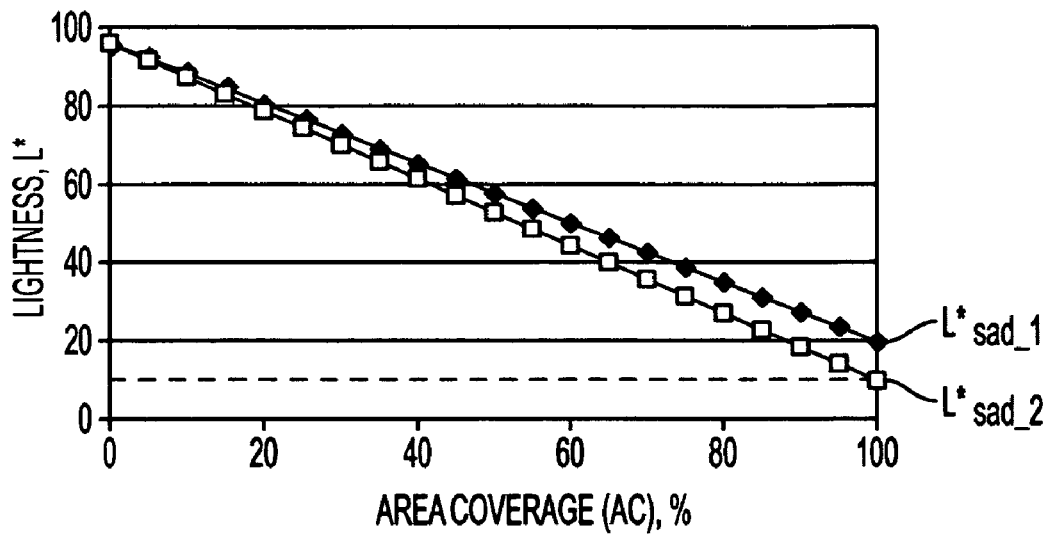
FIG. 3 is a graphical representation of lightness of two marking engines versus area coverage.

$\Delta L^*$ is the engine to engine difference in lightness;
$L^*_1(AC)$ is the lightness of the first marking engine;
$L^*_2(AC)$ is the lightness of the second marking engine;
$L^*_{sad\_1}$ is the lightness of the solid area or the solid area density of the first marking engine, or $L^*sad_1(100)$;
$L^*_{sad\_2}$, is the lightness of the solid area or the solid area density of the second marking engine or $L^*sad_2(100)$; and
AC is the area coverage of the "fill" of a given input patch or sample. For example:
AC(0)=paper
AC(100)=solid fill
AC(50)=midtone gray With reference to FIG. 3, the first marking engine 10 saturates at a higher value of the lightness $L^*$ as compared to the second marking engine 12. In the example of FIG. 3, the first marking engine 10 is a monochrome marking engine, while the second marking engine 12 is a color marking engine.

Figure 4:
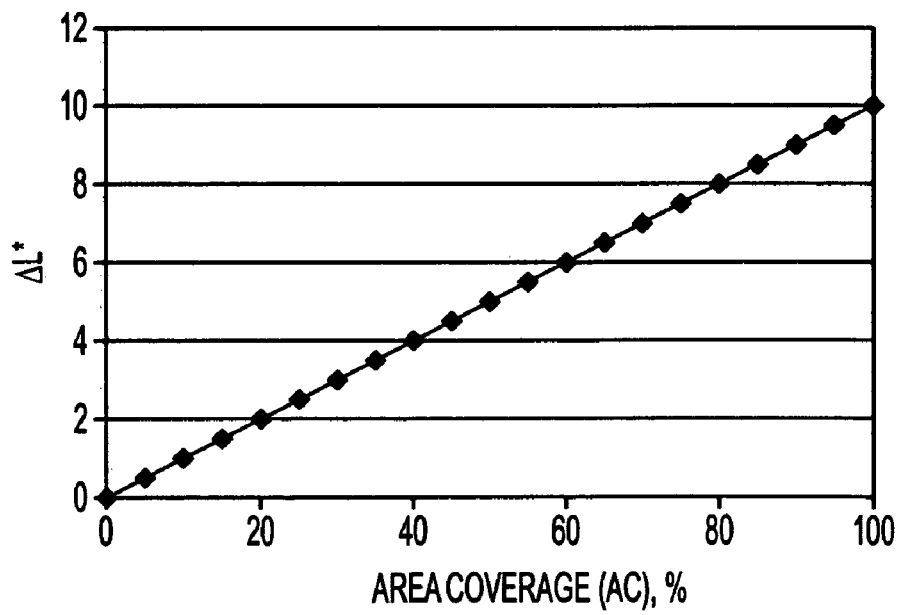
FIG. 4 is a graphical representation of engine to engine lightness difference versus area coverage.

With reference to FIG. 4, the engine to engine difference in lightness $\Delta L^*$ increases linearly in relation to the area coverage AC.

Figure 5:
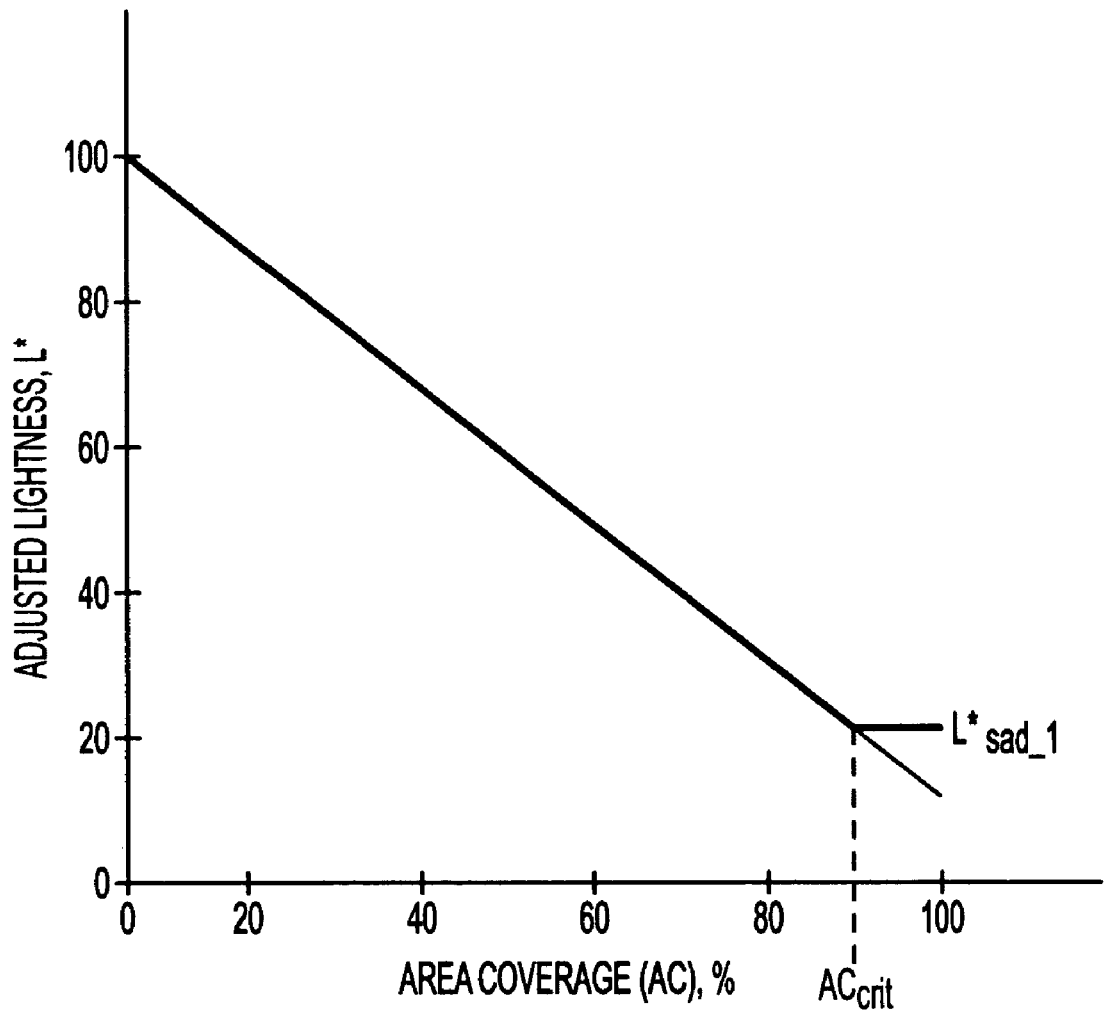
FIG. 5 is a graphical representation of adjusted lightness of a marking engine.

With reference again to FIGS. 1 and 2 and further reference to FIG. 5, the analyzer 22 changes the tone reproduction curve (TRC) of the first or lighter marking engine 10 to match the TRC of the second or darker marking engine 12. More specifically, the analyzer 22 changes the TRC of the first marking engine 10 for the area coverage AC less than cutoff or critical area coverage $AC_{crit}$ and then clips the TRC at its minimum lightness, e.g. the lightness of the solid area $L^*_{sad\_1}$. The critical area coverage $AC_{crit}$ is the area coverage of the darker engine, e.g. the second marking engine 12, in which the lightness of the second marking engine 12 is equal to or greater than the saturation density $L^*_{sad\_1}$ of the lighter engine, e.g. the first marking engine 10. The critical area coverage $AC_{crit}$ of the darker marking engine is determined 250 according to the equation:

$$AC_{crit} = \frac{L^*_{sad\_1} - L^*_{paper}}{L^*_{sad\_2} - L^*_{papr}} * 100, \text{ where}$$

$AC_{crit}$ is the critical area coverage;
$L^*_{sad\_1}$ is the lightness of the solid area or the solid area density of the first marking engine;
$L^*_{sad\_2}$ is the lightness of the solid area or the solid area density of the second marking engine; and
$L^*_{paper}$ is the lightness of the print media.

If the scaled saturation S is defined as $$S = \frac{L^*_{sad\_1} - L^*_{paper}}{L^*_{sad\_2} - L^*_{paper}},$$

then $$AC_{crit} = S * 100$$

An adjusted lightness $L^*_{adj\_1}$ or TRC of the lighter or first marking engine 10 is defined 260 as $$L^*_{adj\_1} = L^*_{paper} + \frac{L^*_{sad\_2} - L^*_{paper}}{100} * AC \quad \text{for } AC < AC_{crit} \text{ and}$$

$$L^*_{adj\_1} = L^*_{sad\_1} \quad \text{for } AC \geq AC_{crit}$$

where $L^*_{adj\_1}$ is the adjusted lightness of the first marking engine;
$AC_{crit}$ is the critical area coverage;
$L^*_{sad\_1}$ is the lightness of the solid area or the solid area density of the first marking engine;
$L^*_{sad\_2}$ is the lightness of the solid area or the solid area density of the second marking engine; and
$L^*_{paper}$ is the lightness of the print media.

The TRC of the first or lighter marking engine 10 is adjusted 270 in accordance with the determined adjusted lightness values $L^*_{adj\_1}$, for each corresponding area coverage AC.

In this manner, the TRC differences between the lighter and darker marking engines or, for example, monochrome and color marking engines are minimized, while the gamut of the darker or color marking engine is preserved.

Although the discussion above concerns only two print engines, the control method 200 is applicable to the printing system which includes more than two print engines. In such system, the engine having the largest error is adjusted to closer match the xerography of other engines.

Of course, it is contemplated that the gamut of the color marking engine can be adjusted to match the gamut of the monochrome marking engine.

It will be appreciated that variants of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:
1. A method comprising:
   printing samples on print media with at least first and second marking engines;

determining a first lightness value of a solid area of a first sample printed with the first marking engine;
determining a second lightness value of a solid area of a second sample printed with the second marking engine;
comparing the first and second solid area lightness values to one another;
based on the comparison, identifying a lighter marking engine and a darker marking engine;
determining lightness value of the print media;
determining a critical area coverage of the darker marking engine as being directly proportional to a scaled solid area density which is a result of a division of a difference between the first solid area lightness value and the print media lightness value and a difference between the second solid area lightness value and the print media lightness value:

$$AC_{crit} = S * 100;$$
$$S = \frac{L^*_{sad\_1} - L^*_{paper}}{L^*_{sad\_2} - L^*_{paper}}, \text{ where}$$

$AC_{crit}$ is the critical area coverage of the darker marking engine;
S is a scaled solid area density;
$L^*_{sad\_1}$ is the first solid area lightness value;
$L^*_{sad\_2}$ is the second solid area lightness value; and
$L^*_{paper}$ is the lightness value of the print media; and
adjusting tone reproduction curve of the lighter marking engine to substantially match tone reproduction curve of the darker marking engine.

2. The method of claim 1, wherein the lighter marking engine is one of a monochrome and color marking engine and the darker marking engine is a color marking engine.

3. The method of claim 2, wherein the lighter marking engine is the monochrome marking engine and further including one of:
decreasing lightness of the monochrome marking engine; and
adjusting lightness of the monochrome marking engine to a constant.

4. The method of claim 1, wherein the step of adjusting the tone reproduction curve of the lighter marking engine to substantially match the tone reproduction curve of the darker marking engine includes:
decreasing lightness of the lighter marking engine for an area coverage which is less than the critical area coverage; and
adjusting lightness of the lighter marking engine to a constant for the area coverage which is equal to or greater than the critical area coverage.

5. The method of claim 4, wherein the constant is equal to the first solid area lightness value.

6. The method of claim 1, wherein at least one marking engine is a xerographic marking engine.

7. A document processing system comprising:
two or more marking engines for printing samples on print media, each sample including at least a solid area;
a sensor for measuring light reflected from each printed sample;
an analyzer for analyzing light measurements associated with the samples printed with the engines, determining a lightness value of each solid area of each printed sample, and comparing the solid area lightness values to one another to identify lighter and darker marking engines;
a sensor for measuring lightness value of the print media;
an analyzer for determining a critical area coverage of the darker marking engine as being directly proportional to a scaled solid area density which is a result of a division of a difference between the first solid area lightness value and the print media lightness value and a difference between the second solid area lightness value and the print media lightness value:

$$AC_{crit} = S * 100;$$
$$S = \frac{L^*_{sad\_1} - L^*_{paper}}{L^*_{sad\_2} - L^*_{paper}}, \text{ where}$$

$AC_{crit}$ is the critical area coverage of the color marking engine;
S is a scaled solid area density;
$L^*_{sad\_1}$ is the first solid area lightness value;
$L^*_{sad\_2}$ is the second solid area lightness value; and
$L^*_{paper}$ is the lightness value of the print media; and
an actuator adjuster for adjusting tone reproduction curve of the lighter marking engine to substantially match tone reproduction curve of the darker marking engine.

8. The system of claim 7, wherein the lighter marking engine is one of a monochrome and color marking engine and the darker marking engine is a color marking engine.

9. The system of claim 8, wherein the actuator adjuster one of:
decreases lightness of the lighter marking engine; and
adjusts lightness of the lighter marking engine to a constant.

10. The system of claim 9, wherein the constant is equal to the solid area lightness value of the lighter marking engine.

11. The system of claim 8, wherein the actuator adjuster decreases lightness of the lighter marking engine in a first area coverage region and adjusts lightness of the lighter marking engine to the solid area lightness value of the lighter marking engine in a second area coverage region.

12. The system of claim 11, wherein the second area coverage region includes an area coverage of the darker marking engine in which lightness of the darker marking engine is less than the solid area lightness value of the lighter marking engine.

13. The system of claim 8, wherein the lighter marking engine is a monochrome marking engine.

14. The system of claim 7, wherein at least one marking engine is a xerographic marking engine.

15. A method comprising:
printing samples on print media with at least monochrome and color marking engines;
determining a first lightness value of a solid area of a first sample printed with the monochrome marking engine;
determining a second lightness value of a solid area of a second sample printed with the color marking engine;
determining lightness value of the print media;
determining a critical area coverage of the color marking engine as being directly proportional to a scaled solid area density which is a result of a division of a difference between the solid area lightness value of the monochrome marking engine and the print media lightness value and a difference between the solid area lightness value of the color marking engine and the print media lightness value:

$$AC_{crit} = S*100;$$

$$S = \frac{L^*_{sad\_1} - L^*_{paper}}{L^*_{sad\_2} - L^*_{paper}}, \text{ where}$$

$AC_{crit}$ is the critical area coverage of the color marking engine;

S is a scaled solid area density;

$L^*_{sad\_1}$ is the first solid area lightness value;

$L^*_{sad\_2}$ is the second solid area lightness value; and $L^*_{paper}$ is the lightness value of the print media; and adjusting tone reproduction curve of the monochrome marking engine to substantially match tone reproduction curve of the color marking engine.

16. The method of claim 15, wherein the step of adjusting the tone reproduction curve of the monochrome marking engine to substantially match the tone reproduction curve of the color marking engine includes:

decreasing lightness of the monochrome marking engine for an area coverage which is less than the critical area coverage; and adjusting lightness of the monochrome marking engine to a constant for the area coverage which is equal to or greater than the critical area coverage.

* * * * *